United States Patent
McClung et al.

(10) Patent No.: US 7,213,056 B2
(45) Date of Patent: May 1, 2007

(54) PROVIDING MODULAR TELEPHONY SERVICE

(75) Inventors: Michael H. McClung, Earlysville, VA (US); James R. Tighe, Frisco, TX (US); Frank R. Zerangue, Jr., Dallas, TX (US)

(73) Assignee: Cisco Technology, Inc., San Jose, CA (US)

( * ) Notice: Subject to any disclaimer, the term of this patent is extended or adjusted under 35 U.S.C. 154(b) by 838 days.

(21) Appl. No.: 10/616,177

(22) Filed: Jul. 9, 2003

(65) Prior Publication Data

US 2005/0008022 A1    Jan. 13, 2005

(51) Int. Cl.
*G06F 15/16* (2006.01)
*G06F 15/113* (2006.01)

(52) U.S. Cl. ............... 709/218; 709/223; 709/227; 715/513; 370/389

(58) Field of Classification Search ............... 709/218, 709/225, 227, 228; 715/513, 501; 370/389; 705/40
See application file for complete search history.

(56) References Cited

U.S. PATENT DOCUMENTS

| | | | | |
|---|---|---|---|---|
| 6,286,033 | B1 | 9/2001 | Kishinsky et al. | 709/203 |
| 6,507,817 | B1 | 1/2003 | Wolfe et al. | 704/260 |
| 6,564,321 | B2 | 5/2003 | Bobo, II | 713/168 |
| 6,578,000 | B1 | 6/2003 | Dodrill et al. | 704/270 |
| 6,587,547 | B1 | 7/2003 | Zirngibl et al. | 379/88.17 |
| 6,738,803 | B1* | 5/2004 | Dodrill et al. | 709/218 |
| 6,950,872 | B2 | 9/2005 | Todd, II | 709/227 |
| 6,959,325 | B2 | 10/2005 | Gardner et al. | 709/206 |
| 6,961,760 | B2 | 11/2005 | Li et al. | 709/219 |
| 6,968,334 | B2 | 11/2005 | Salmenkaita et al. | 707/10 |
| 7,069,291 | B2* | 6/2006 | Graves et al. | 709/201 |
| 2002/0007324 | A1* | 1/2002 | Centner et al. | 705/26 |
| 2004/0125798 | A1* | 7/2004 | Hondo et al. | 370/389 |
| 2005/0065879 | A1* | 3/2005 | Birch et al. | 705/40 |
| 2006/0026552 | A1* | 2/2006 | Mazzitelli et al. | 717/101 |
| 2006/0090165 | A1* | 4/2006 | Martin et al. | 719/318 |

OTHER PUBLICATIONS

PCT International Search Report in International Application No. PCT/US04/22033, dated Jan. 11, 2006, 11 pages.

* cited by examiner

*Primary Examiner*—Khanh Dinh
(74) *Attorney, Agent, or Firm*—Baker Botts L.L.P.

(57) ABSTRACT

A method for providing telecommunication service to a terminal includes loading a text-based script. The text-based script includes a service definition identifying a user interface web service and an address for the user interface web service. The text-based script also includes a signaling web service definition identifying a signaling web service and an address for the signaling web service. Additionally, the text-based script includes a user interface event handler identifying a user interface event type and including a call to the user interface web service, and a signaling event handler identifying a signaling event type and including a call to the signaling web service. The method additionally includes registering with the user interface web service by communicating a text-based message to the address of the user interface web service, and registering with the signaling web service by communicating a text-based message to the address of the signaling web service. The method further includes receiving an incoming event, determining that the incoming event corresponds to the user interface event type or the signaling event type, and communicating a service request to the address of one of the user interface web service or the signaling web service.

23 Claims, 4 Drawing Sheets

PROVIDING MODULAR TELEPHONY SERVICE

TECHNICAL FIELD OF THE INVENTION

The present invention relates generally to telephony communications and, more particularly, to providing modular telephony services.

BACKGROUND OF THE INVENTION

As the telecommunications industry rapidly evolves, the ease of implementing and integrating new features and services creates a significant hurdle to further development. Updating functionality or integrating new features can often require service disruptions or replacement of hardware.

SUMMARY OF THE INVENTION

In accordance with the present invention, techniques for modular provision of telephony services are provided. According to particular embodiments, these techniques enable distribution of telephony features among modules, with a controlling module accessing these features based upon execution of text-based scripts. Particular embodiments use publicly defined communication protocols for interactions between the modules.

In accordance with a particular embodiment, a method for modular provision of telephony services includes loading a text-based script comprising a service definition identifying a web service, an address of the web service, and an event handler identifying an event type and including a call to the web service. The method further includes receiving an incoming event, determining that the incoming event corresponds to the event type of the event handler, and communicating a service request to the web service using the address.

Technical advantages of certain embodiments include real-time processing and service provision for both voice and data. Other technical advantages of certain embodiments include scalable services that can be modified at run-time and distributed development and implementation of telephony services.

Additional technical advantages of the present invention will be readily apparent to one skilled in the art from the following figures, description, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
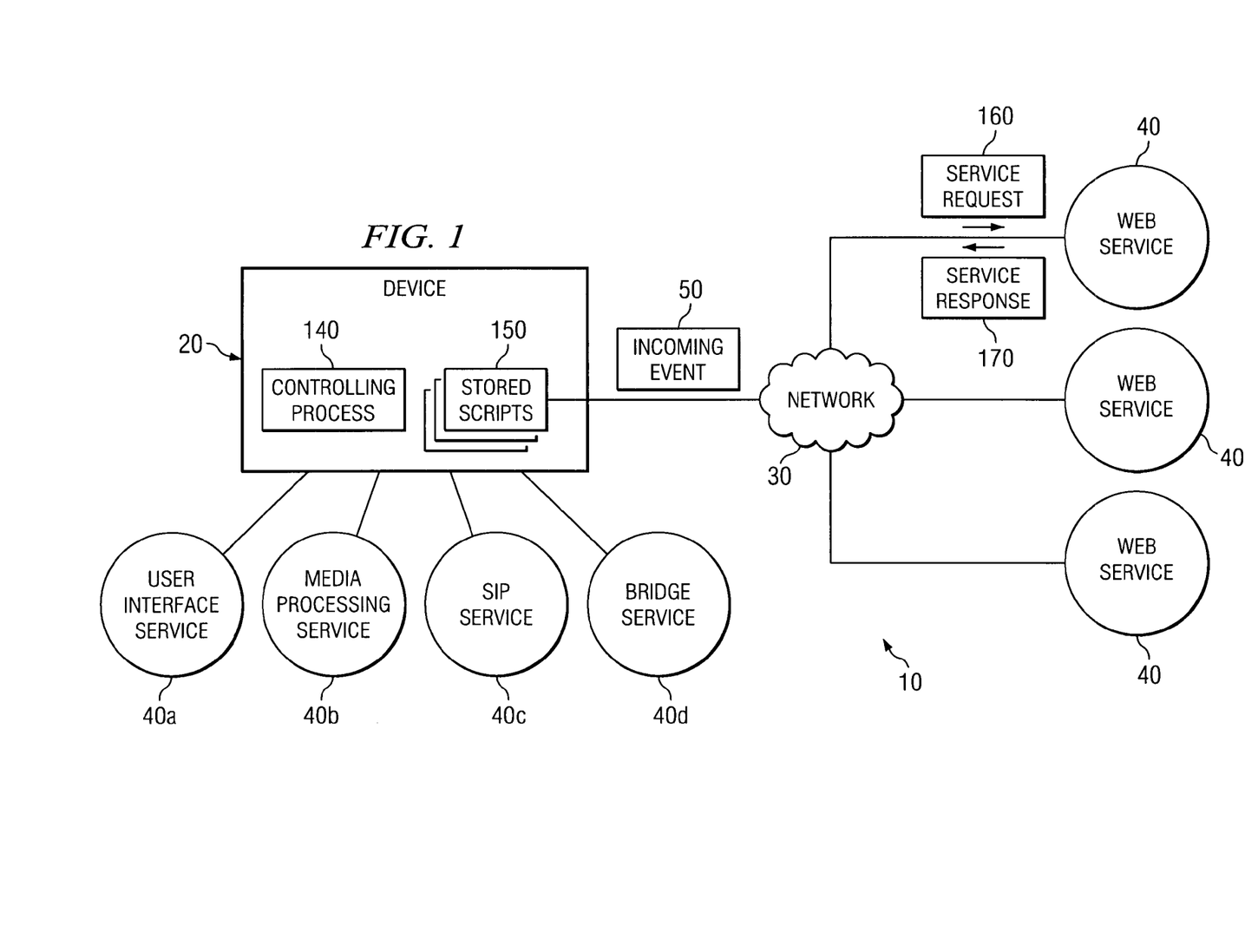
FIG. 1 illustrates a communication system including devices and web services that provide telephony services according to particular embodiments of the present invention.

FIG. 1 illustrates a system 10 that supports modular provision of telephony services. System 10 includes device 20 and web services 40. Device 20 utilizes text-based scripts and telephony features offered by web services 40 to provide telephony services.

Device 20 represents any equipment, including appropriate controlling logic, suitable for providing voice, video, or data communication service to a user. For example, device 20 may be an appropriately enabled phone, computer, PDA, or other suitable device. Device 20 includes user interface and network interface components allowing device 20 to interact, respectively, with users and with network 30.

Web services 40 provide telephony, networking, and other services to device 20. Web services 40 may include software applications maintained local to device 20 or at other locations within system 10. Each web service 40 is operable to provide services in response to a service request 160. The services provided by web services 40 may include, for example, communicating a particular type of a response to a request for service, manipulating a component of system 10, or performing any other suitable operation. Web services 40 may include both local and remote web services 40.

In the embodiment illustrated, system 10 includes particular web services 40, such as user interface service 40a, media processing service 40b, session integration protocol (SIP) service 40c, and bridge service 40d. User interface service 40a may communicate with speakers, microphones, and displays on device 20 to allow a user of device 20 to interact with system 10. Media processing service 40b may provide digital signal processing capability for compression, echo cancellation, silence detection, and other appropriate signal processing. SIP processing service 40c processes SIP communications and facilitates communication between device 20 and other devices on system 10 in accordance with SIP. Bridge service 40d supports conferenced communications between device 20 and multiple other devices in system 10. In various embodiments, these specified functions may be divided among the different web services 40 of the particular system 10 as appropriate.

Network 30 represents any hardware and/or software configured to communicate information in the form of packets, cells, frames, segments, or other portions of data. Network 30 may include routers, hubs, switches, gateways, or any other suitable components in any suitable form or arrangement. Network 30 may also include any combination of public or private communications equipment such as elements of a public switched telephone network (PSTN), a global computer network such as the Internet, a local area network (LAN), a wide area network (WAN), or other appropriate communications equipment.

Each web service 40 may have a unique address, such as a Uniform Resource Identifier, that other entities may use to contact the particular web service 40. According to a particular embodiment, web services 40 communicate with devices coupled to network 30 using messages that are generated according to a publicly-defined messaging protocol, such as SOAP, XML-RPC or WDDX, and communicated according to a publicly-defined network protocol, such as HTTP.

In operation, device 20 provides telecommunication services by processing events that occur on system 10. In a particular embodiment, device 20 initiates a controlling process 140 on device 20. Controlling process 140 implements an idle state following a power up, after executing a stored script 150, or at any other suitable time. When controlling process 140 is in this idle state, events occurring on system 10, such as the depression of a touchpad key by a user or the receipt of a SIP invitation from another device, may result in state changes. Controlling process 140 responds to these changes by retrieving and executing scripts stored remotely or locally, by communicating with web services 40, and by manipulating devices on system 10 relevant to the provision of communication services.

More specifically, in a particular embodiment, an event occurring on system 10 results in web services 40, other devices 20, or any appropriate components of system 10 generating and transmitting an incoming event 50 to controlling process 140. Incoming event 50 may be a message written in a text language supported by controlling process 140 and transported according to a publicly-available network protocol. For example, event 50 may include XML-style commands and may be communicated within or to device 20 using HTTP.

Controlling process 140 running on device 20 may receive a variety of incoming events 50 from a variety of sources depending on the particular embodiment and configuration of system 10. For example, a user may take a receiver of device 20 off-hook, causing user interface service 40*a* to generate and transmit incoming event 50 indicating the offhook event. As another example, SIP processing service 40*c* may receive an incoming event 50 through network 30 that includes a SIP request for connection from another device 20. SIP processing service 40*c* may then indicate this request by communicating an incoming event 50 to controlling process 140. Similarly, device 20 may respond to incoming events 50 in various ways. The receipt of an incoming event 50 may result in device 20 executing stored scripts 150, utilizing web services 40, interacting with other components of network 30 or taking any other appropriate actions. Moreover, while shown as having a single controlling process 150, device 20 may simultaneously load and execute any number of controlling processes 140. For example, an initial controlling process 140 may spawn multiple other controlling processes 140 to handle various taks.

Controlling process 140 may utilize services offered by web services 40, operating locally or remotely, in executing stored scripts 150 or in responding to incoming events 50. To utilize these services, controlling process 140 generates and transmits to web service 40 a service request 160. According to particular embodiments, service request 160 is a text message formatted according to a publicly-available messaging protocol, such as SOAP, XML-RPC, or WDDX, and may contain information pertaining to the state of device 20, information identifying a current user of device 20, or any other suitable information based on characteristics of the particular web service 40. Furthermore, if web service 40 provides multiple services, service request 160 may include information identifying a particular service offered by web service 40. After generating service request 160, controlling process 140 may communicate service request 160 to web service 40 using a publicly-defined network protocol, such as HTTP or any other suitable alternative.

Prior to generating service request 160, controlling process 140 may access information describing the appropriate structure or content of service requests 160 to the relevant web service 40. For example controlling process 140 may retrieve information about web service 40 from a Web Service Description Locator (WSDL) document associated with the web service 40. This information may indicate the appropriate manner of communicating with web service 40, information required in service request 160, information to be returned in service response 170 or any other suitable information.

In a particular embodiment, controlling process 140 supports communication with web services 40 according to a publicly-available communication protocol and controlling process 140 accepts scripts structured according to the syntax of a publicly-available language. When utilizing these techniques, controlling process 140 can access the features of web services 40 developed to provide services outside of traditional telephony and can utilize the processing power of web services 40 that are located external to device 20. For example, controlling process 140 may utilize a remote, weather-related web service to access current temperature information for a user of device 20. Additionally, in a particular embodiment, controlling process 140 may identify and locate at run-time some or all of the web services 40 to be used. If system 10 is configured to operate in this manner, web services 40 may be updated, replaced, or otherwise modified independent of device 20.

Stored scripts 150 and incoming events 50 may identify particular web services 40 and associate an address with the identified web service 40 by which controlling process 140 may contact the identified web service 40. For example, a stored script may identify a web service 40 and associate a Uniform Resource Identifier with that web service 40. As previously noted, web services 40 may communicate with devices coupled to network 30 using messages that are generated according to a publicly-defined messaging protocol, such as SOAP, XML-RPC, or WDDX, and communicated according to a publicly-defined network protocol, such as HTTP.

Upon receiving service request 160, web service 40 parses service request 160 and provides the service requested. In response to the service request 160, web service 40 may manipulate a component of device 20 or system 10. For example, controlling process 140 may request that a web service 40 associated with user interface module 120 display caller ID information on user interface module 120. Web service 40 may, additionally or alternatively, generate a service response 170 and transmit the service response 170 to controlling process 140. According to particular embodiments, service response 170 is a text message that conforms to the syntax of a publicly-defined language for transmitting data, such as XML.

When controlling process 140 receives an incoming event 50 or a service response 170, processor 100 determines whether an event handler is associated with the particular type of incoming event 50 or service response 170 received. If so, controlling process 140 executes the event handler associated with the type of event 50 or service response 170 received. Executing particular event handlers may include generating and transmitting service requests 160, loading stored scripts 150 from memory 110, manipulating components of device 20 or system 10, or any other actions suitable for handling incoming events 50 or service responses 170 receive by controlling process 140.

For example, in operation in a particular embodiment, controlling process 140 loads and executes a stored script 150 after power up. The stored script 150 identifies user interface service 40*a*, media processing service 40*b*, SIP processing service 40*c*, and bridge service 40*d* and provides an address for each. As a result of processing stored script 150, controlling process 140 registers with user interface service 40a, media processing service 40b, SIP processing service 40c, and bridge service 40d. After controlling process 140 registers with SIP processing service 40c, SIP processing service 40c receives a SIP invitation identifying device 20 and/or controlling process 140 from a telephone coupled to network 30. SIP processing service 40c sends an incoming event 50 indicating an incoming call to controlling process 140. The format for this incoming event 50 may be specified during registration or in a WDSL file associated with SIP processing service 40c.

In this exemplary embodiment, controlling process 140 transmits a service request 160 to user interface service 40a upon receiving the incoming event 50 from SIP processing service 40c. The service request 160 requests user interface service 40a to indicate an incoming call on a display associated with device 20. Controlling process 140 sends a service request 160 to SIP processing service 40c indicating that device 20 is ringing. SIP processing service 40c then transmits a SIP message to the calling telephone.

Continuing this example, if user interface service 40a detects an offhook signal on device 20, user interface 40a transmits an incoming event 50 indicating the offhook signal to controlling process 140. In response, controlling process 140 transmits a service request 160 to SIP processing service 40c indicating the offhook state of device 20 and the identity and location of the media processing service 40b with which device 20 is registered. SIP processing service 40c sends a SIP OK message to the remote phone. SIP processing service 40c informs the remote phone of the media processing service 40b to which device 20 is registered. The remote telephone and media processing service 40b setup a media stream. Media processing service 40b then provides the media stream to device 20, controlling process 140, or directly to user interface service 40a, to be transmitted to a speaker and microphone of device 20. This example illustrates the provision of telephony services using a number of separate web services 40. However, while particular web services 40 are described as providing particular services, system 10 contemplates any suitable types and distribution of functionality between any number of local and/or remote web services 40. For example, while SIPS signaling is illustrated in this example, system 10 contemplates signaling web services 140 using any suitable signaling protocols. Thus, controlling process 140 may access any suitable web services 40 operating locally within device 20 or on other elements within system 10.

Figure 2:
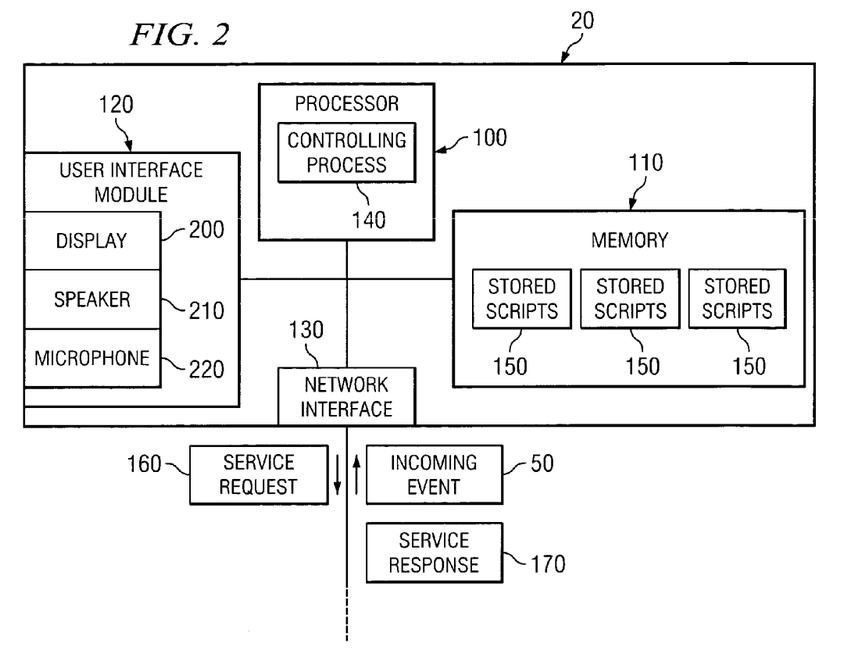
FIG. 2 is a block diagram illustrating an exemplary communication device operable to communicate with web services to provide telephony services.

FIG. 2 is a block diagram illustrating an exemplary embodiment of device 20 that includes a processor 100, a network interface 130, a user interface 120 and a memory 110. In general, device 20 provides a controlling process 140, such as a process within processor 100, that loads and executes text based scripts and accesses web services 40 in order to provide telephony services. According to particular embodiments, device 20 may simultaneously execute multiple processes within a processor 40 to provide state machines for responding to different types of telephony events.

Processor 100 executes scripts received or accessed by device 20. Processor may host a controlling process 140 and one or more local web services 40. Processor 100 may be a general purpose computer, dedicated microprocessor, or other processing device capable of communicating electronic information. Examples of processor 100 include application-specific integrated circuits (ASICs), field-programmable gate arrays (FPGAs), digital signal processors (DSPs) and any other suitable specific—or general-purpose processors.

Memory 110 stores text scripts utilized by device 20 including stored script 150. Memory 110 may comprise any collection and arrangement of volatile or non-volatile, local or remote devices suitable for storing data, such as for example random access memory (RAM) devices, read only memory (ROM) devices, magnetic storage devices, optical storage devices, or any other suitable data storage devices.

User interface 120 facilitates the exchange of information between device 20 and users of device 20. In a particular embodiment, user interface includes a speaker 210, a microphone 220, a display 230, and a user input interface 240. The user interfaces provide for the exchange of information with users of device 20. Speaker 210 generates audio signals, and microphone 220 receives and processes audio signals from a user. Through display 230, device 20 presents information to a user. For example, display 230 may include LEDs, graphical displays and other devices for visually displaying or otherwise presenting information. User input interface 240 represents any suitable elements for receiving input, other than audio signals, from a user. For example, user input interface 240 may include a number keypad, buttons referencing to portions of display 230, a pointing device, and other appropriate input interfaces. According to a particular embodiment, web services 40 may control and provide for interaction with low-level functions of user interface module 120 through text-based messages such as service requests 160. For example, in a particular embodiment, a controlling process 140 may transmit a service request 160 containing a line of text that includes "<RING>" to a user interface service 40a. In response, user interface service 40a may generate machine-language commands, send electronic signals to physical devices, or take other appropriate actions to generate a "ring" tone at speaker 210 of user interface module 120.

Network interface 130 provides for communication between device 20, remote web services 40 and other telephony equipment. Network interface 130 may provide both controlling process 140 and local web services 40 with an interface to network 30. For example, in a particular embodiment, network interface 130 is capable of transmitting a service request 160 from controlling process 140 to network 30 for delivery to a remote web service 40 and also of delivering a SIP invitation for device 20 to SIP processing service 40c.

In operation, after implementing an idle state in device 20, a controlling process 140 within processor 100 may wait for an incoming event 50 received from a local or remote web service 40, or other appropriate device. When device 20 receives an incoming event 50, controlling process 140 detects and process the incoming event 50. In doing so, controlling process 140 may load and execute stored scripts 150; manipulate components of device 20, either directly or through local web services 40; generate and transmit service requests 160 to local or remote web services 40; or take any other suitable actions.

If execution of a stored script 150 or processing of an incoming event 50 requires controlling process 140 to access a remote stored script 150 or a remote web service 40, controlling process 140 may utilize network interface 130 to achieve this. For example, if processing a particular incoming event 50 requires use of a remote web service 40, controlling process 140 may generate a service request 160 and communicate the service request 160 to network interface 130. Network interface 130 may then transmit the service request 160 to the remote web service 40 in question, according to appropriate protocols and techniques.

If execution of a stored script 150 or processing of an incoming event 50 requires utilization of the components of user interface module 120, controlling process 140 may manipulate the components directly or may utilize a local web service 40 to manipulate the components. For example, processing of a stored script 150 may require displaying information, such as caller ID information, or date and time information, to a user of device 20. Controlling process 140 may directly manipulate display 230 to display this information, or alternatively, may utilize user interface service 40a to do so, depending on the configuration of system 10.

Figure 3:
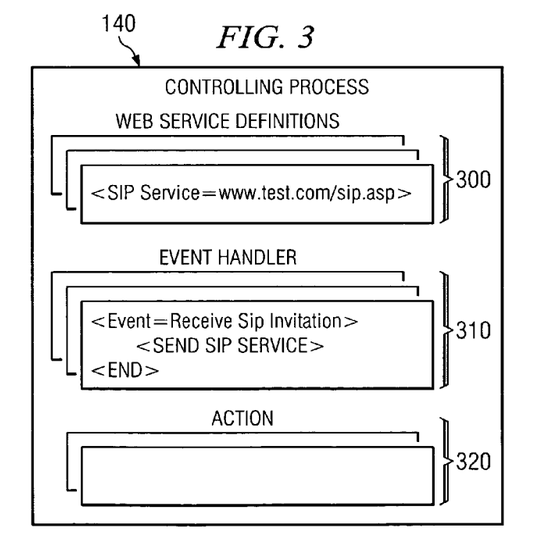
FIG. 3 is a block diagram illustrating exemplary components of a stored script.

Any of the components of device 20 may include logic encoded in media for carrying out designated functions. This media may include computer disks or other suitable computer-readable media, application-specific integrated circuits (ASICs), field-programmable gate arrays (FPGAs), digital signal processors (DSPs), or other suitable specific or general purpose processors, transmission media or suitable media in which logic may be encoded and utilized. Additionally, while the illustration and the preceding description focus on a particular embodiment of monitoring device 20 that includes specific elements providing particular functions, system 10 contemplates monitoring device 20 having any suitable combination and arrangement of elements providing telephony services within device 20. Thus, the functionalities performed by the particular elements illustrated may be separated or combined as appropriate FIG. 3 is an illustration of an exemplary stored script 150 according to one embodiment of system 10. Although in this particular embodiment, stored script 150 conforms to XML, stored script 150 may alternatively utilize any suitable text-based language. Stored script 150 includes a plurality of web service definitions 3000, a plurality of event handlers 310, and a plurality of actions 320.

Web service definitions 3000 may include text commands that identify web services. In a particular embodiment, web service definitions 3000 represent XML commands that identify web services 40 available on system 10. Web service definitions 300 may include an address that device 20 may use to communicate with identified web service 40. For example, web service definition 300 may include a URI specifying the location of the identified web service 40.

Actions 320 represent commands to be executed by controlling process 140 upon loading stored script 150. These commands may process received inputs, manipulate data, spawn other controlling processes 140, link to other stored scripts 150, or carry out any other appropriate functions.

Event handlers 310 are XML statements that define how device 20 should respond to incoming events 50. Each event handler 310 is associated with a particular type of incoming event 50. When controlling process 140 receives an incoming event 50, controlling process 140 determines what steps to take based on the event handler 310 associated with the particular incoming event 50 received. For example, if controlling process 140 receives an incoming event 50 of type "Receive SIP Invitation" after loading stored script 150, the incoming event 50 will be handled by a call to web service "SIP Service."

An event handler 310 in stored script 150 may utilize the features of a web service 40 to process incoming events 50. If so, event handler 310 identifies and provides the location of the associated web service 150, for example, by reference to its Uniform Resource Identifier (URI).

To utilize a web service 40, an event handler 310 may generate an service request 160 and communicate the service request 160 to the web service 40 according to a publicly-available messaging protocol such as SOAP, XML-RPC, or another suitable protocol. Service request 160 may be a text-based message that includes information about the state of device 20, information about a service being requested from web service 40, or any other suitable information. Upon receipt of service request 160, web service 40 processes service request 160 as appropriate based on the services provided by web service 40, the information included in service request 160, or any other appropriate circumstances. For example, the service request 160 may identify a phone number associated with device 20. In response to the service request 160, the web service 40 may provide callers to the phone number a series of user recorded prompts for voicemail applications, or may replay for a user messages recorded for the phone number.

Figure 4:
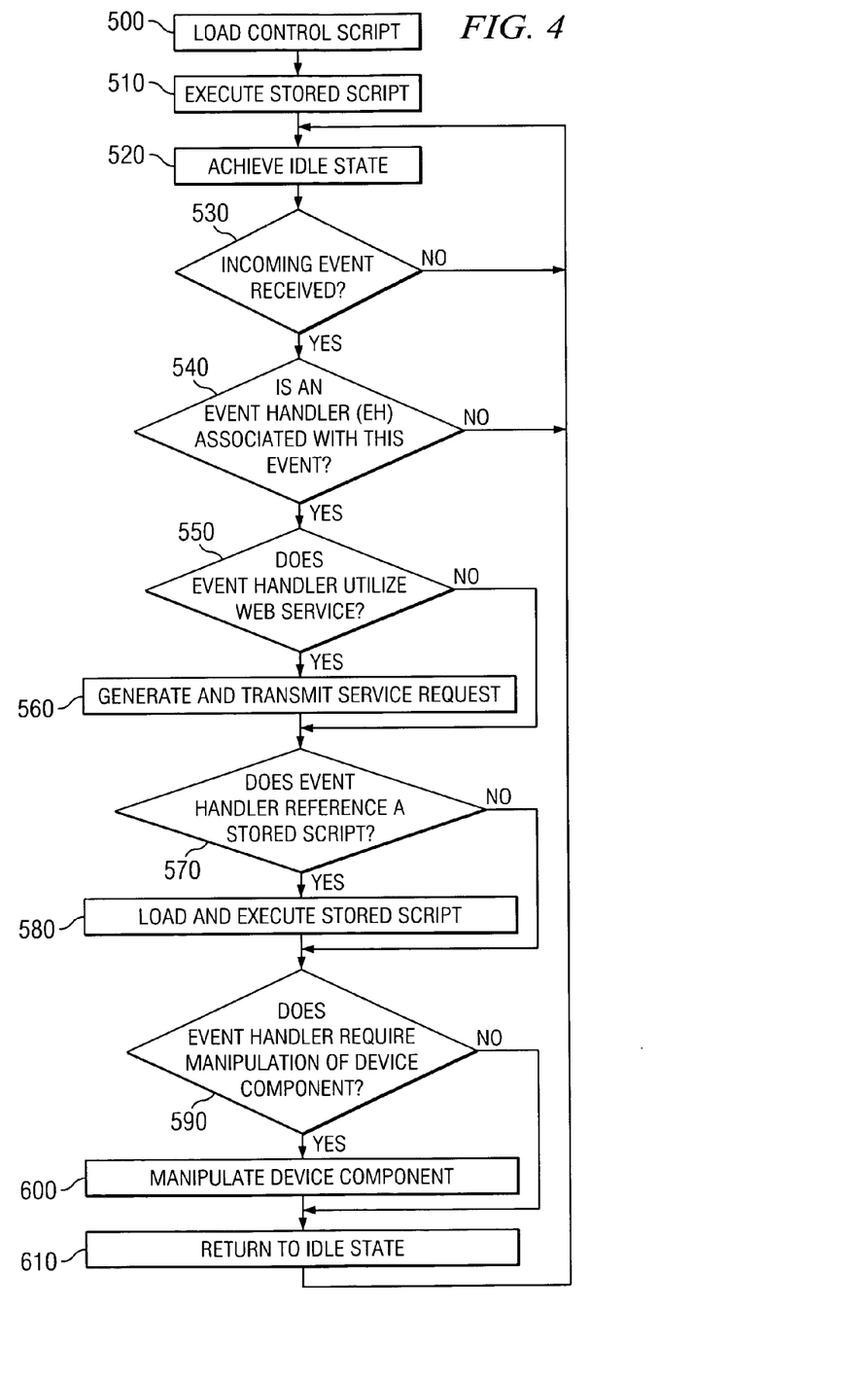
FIG. 4 is a flowchart illustrating a method for providing modular telephony services using web services.

FIG. 4 is a flowchart illustrating the operation of one embodiment of device 20. At step 500, controlling process 140 loads stored script 150 from memory 110. Controlling process 140 executes stored script 150 at step 510. As a result of executing stored script 150, controlling process 140 achieves an idle state at step 520. Controlling process 140 maintains the idle state if controlling process 140 does not receive an incoming event 50 at step 530.

If controlling process 140 receives an incoming event 50, controlling process 140 determines whether an event handler 310 in stored script 150 corresponds to incoming event 50 at step 540. If not, controlling process 140 returns to idle state.

If an event handler 310 corresponds to the incoming event 50, controlling process 140 responds to incoming event 50 using the corresponding event handler 310. At step 550, controlling process 140 determines whether event handler 310 utilizes a web service 40. If the event handler 310 utilizes a web service 40, controlling process 140 generates and transmits a service request 160 at step 560. If the service requested of web service 40 requires a response, controlling process 140 may wait until receiving a service response 170 from web service 40.

At step 570, controlling process 140 determines whether event handler 310 references a stored script 150. If the event handler references a stored script 150 in memory 110, controlling process 140 loads and executes the stored script 150 at step 580. At step 590, controlling process 140 determines whether event handler 310 requires manipulation of a component of device 20. If the event handler requires manipulation of a component of device 20, such as network interface 130, controlling process 140 manipulates the component at step 600.

After processing incoming event 50 with event handler 310, controlling process 140 returns to the idle state at step 610. Controlling process 140 remains in the idle state until receiving another incoming event 50. Controlling process 140 then repeats the process starting at step 520.

Figure 5:
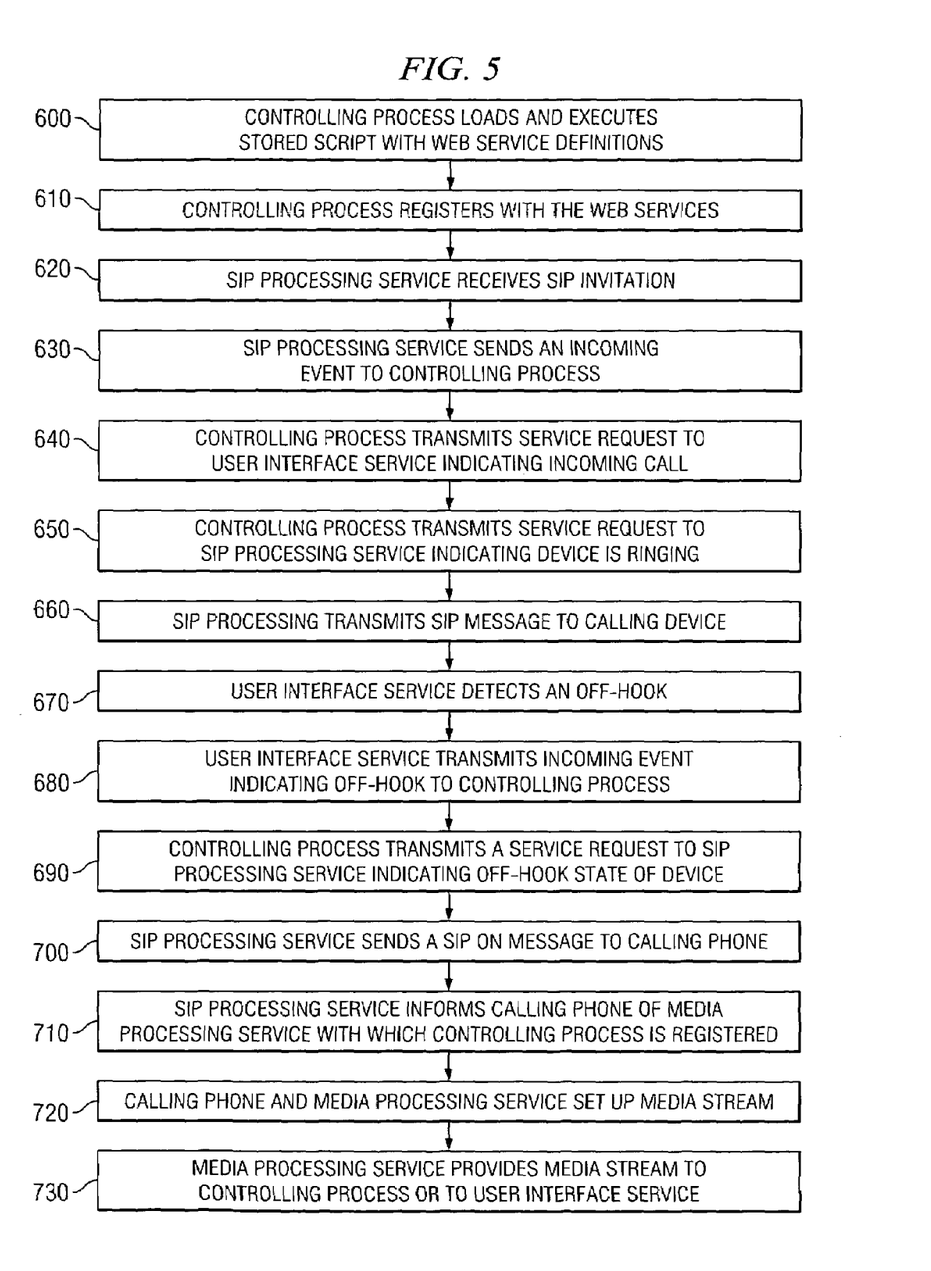
FIG. 5 is a flowchart illustrating a method for processing scripts to provide telephony services.

FIG. 5 is a flow chart illustrating operation of one embodiment of system 10. At step 600, controlling process 140 loads and executes a stored script 150 which identifies various web services 40. Controlling process 140 registers with the web services 40 at step 610, including SIP processing service 40c and user interface service 40a. At step 620, SIP processing service 40c receives a SIP invitation from a calling phone coupled to network 30. SIP processing service 40c sends an incoming event 50 indicating an incoming call to a controlling process 140 at step 630.

At step 640, controlling process 140 transmits a service request 160 to user interface service 40a requesting that user interface service 40a indicate an incoming call on a display associated with controlling process 140. At step 650, controlling process 140 sends a service request 160 to SIP processing service 40c indicating that device 20 is ringing. SIP processing service 40c transmits a SIP message to the calling phone at step 660 indicating that device 20 is ringing.

At step 670, user interface service 40a detects an offhook signal on controlling process 140. User interface 40a transmits an incoming event 50 indicating the offhook signal to controlling process 140 at step 680. At step 690, controlling process 140 transmits a service request 160 to SIP processing service 40c indicating the offhook state of device 20. The service request 160 also includes the identity and location of the media processing service 40b with which controlling process 140 is registered. SIP processing service 50c sends a SIP OK message to the calling phone at step 700.

At step 710, SIP processing service 40c informs the calling phone of the media processing service 40b to which controlling process 140 is registered. The calling phone and media processing service 40b setup a media stream at step 720. At step 730, media processing service 40b provides the media stream to controlling process 140, or directly to user interface service 40a, to be transmitted to a speaker and microphone of controlling process 140.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method of providing telecommunication service to a terminal comprising:
    loading a text-based script comprising a service definition identifying a user interface web service and an address of the user interface web service, a signaling web service definition identifying a signaling web service and an address of the signaling web service, a user interface event handler identifying a user interface event type and including a call to the user interface web service, and a signaling event handler identifying a signaling event type and including a call to the signaling web service;
    registering with the user interface web service by communicating a text-based message to the address of the user interface web service;
    registering with the signaling web service by communicating a text-based message to the address of the signaling web service;
    receiving a text-based incoming event from the signaling web service indicating an incoming call;
    determining that the incoming event corresponds to one of the user interface event type and the signaling event type;
    communicating a service request to the address of one of the user interface web service and the address of the signaling web service;
    sending a ring service request to the user interface web service in response to receiving the text-based incoming event from the signaling web service;
    waiting a predetermined period of time after sending the ring service request;
    sending a service request to a voicemail web service, after the predetermined period of time; and
    sending a stop ringing service request to the user interface web service after sending the service request to the voicemail web service.

2. The method of claim 1, wherein the service request comprises Extensible Markup Language (XML) commands.

3. The method of claim 1, wherein communicating comprises communicating using the HyperText Transfer Protocol (HTTP).

4. The method of claim 1, further comprising receiving a service response from one of the user interface web service and the signaling web service.

5. The method of claim 1, wherein registering with the signaling web service comprises registering a particular user with the signaling web service.

6. The method of claim 1, wherein the method further comprises receiving an off-hook event from the user interface web service.

7. A telephony device for providing telecommunication service comprising;
    an audio output operable to transmit voice output to a user;
    an audio input operable to receive voice input from a user;
    a display operable to display information to a user;
    a user input operable to receive an input from the user;
    a network interface operable to receive signals from a network;
    a memory; and
    a controlling process operable to:
        load a text-based script comprising a user interface service definition identifying a user interface web service and an address of the user interface web service, and a user interface event handler identifying a user interface event type;
        register with the user interface web service;
        receive a text-based incoming event from the signaling web service indicating an incoming call;
        determine that the incoming event corresponds to the user interface event type;
        communicate a service request to the user interface web service;
        send a ring service request to the user interface web service in response to receiving the text-based incoming event from the signaling web service;
        wait a predetermined period of time after sending the ring service request;
        send a service request to a voicemail web service, after the predetermined period of time; and
        send a stop ringing service request to the user interface web service after sending the service request to the voicemail web service; and
    a user interface web service, operable to provide low level interface to audio output, audio input, user input, and display, and operable to engage in text-based messaging with controlling process.

8. The system of claim 7, wherein the service request comprises Extensible Markup Language (XML) instructions.

9. The system of claim 7, wherein the controlling process is further operable to communicate the service request by using the HyperText Transfer Protocol (HTTP).

10. The system of claim 7, wherein the controlling process is further operable to receive a service response from the web service.

11. A system for providing modular telecommunication service comprising:
    a network,
    one or more web services,
    a communication device coupled to the network and coupled to the web service, the device operable to:
        load a text-based script, the script comprising a first service definition identifying a user interface web service and an address of the user interface web service, a second service definition identifying a signaling web service and an address of the signaling web service, a user interface event handler identifying a user interface event type, and a signaling event handler identifying a signaling event type; and register with the user interface web service by communicating a text-based message to the address of the user interface web service;

register with the signaling web service by communicating a text-based message to the address of the user interface web service;

receive a text-based incoming event from the signaling web service indicating an incoming call;

determine that the incoming event corresponds to one of the user interface event type and the signaling event type;

communicate a service request to the user interface web service or the signaling web service;

send a ring service request to the user interface web service in response to receiving the text-based incoming event from the signaling web service;

wait a predetermined period of time after sending the ring service request;

send a service request to a voicemail web service, after the predetermined period of time; and send a stop ringing service request to the user interface web service after sending the service request to the voicemail web service.

12. The system of claim 11, wherein the service request comprises Extensible Markup Language (XML) instructions.

13. The system of claim 11, wherein the communication device is further operable to communicate a service request by communicating using the HyperText Transfer Protocol (HTTP).

14. The system of claim 11, wherein the communication device is further operable to receive a service response from the web services.

15. The system of claim 11, wherein the communication device is further operable to register with the signaling web service by registering a particular user with the signaling web service.

16. The system of claim 11, wherein the communication device is further operable to receive an off-hook event from the user interface web service.

17. A computer program stored on a computer readable medium, the computer program operable to:

load a text-based script, the script comprising a service definition identifying a user interface web service and an address of the user interface web service, the script further comprising a service definition identifying a signaling web service and an address of the signaling web service, the script further comprising a user interface event handler identifying a user interface event type and including a call to the user interface web service, the script further comprising a signaling event handler identifying a signaling event type and including a call to the signaling web service;

register with the user interface web service;
register with the signaling web service;
receive a text-based incoming event from the signaling web service indicating an incoming call;

determine that the incoming event corresponds to one of the user interface event type and the signaling event type;

communicate a service request to the address of one of the user interface web service and the address of the signaling web service;

send a ring service request to the user interface web service in response to receiving the text-based incoming event from the signaling web service;

wait a predetermined period of time after sending the ring service request;

send a service request to a voicemail web service, after the predetermined period of time; and send a stop ringing service request to the user interface web service after sending the service request to the voicemail web service.

18. The computer program of claim 17, wherein the service request comprises Extensible Markup Language (XML) commands.

19. The computer program of claim 17, wherein the computer program is further operable to communicate a service request by using the HyperText Transfer Protocol (HTTP).

20. The computer program of claim 17, wherein the computer program is further operable to receive a service response from the web service.

21. The computer program of claim 17, wherein the computer program is further operable to register with the signaling web service by registering a particular user with the signaling web service.

22. The computer program of claim 17, wherein the computer program is further operable to receive an incoming event by sending a ring service request to the user interface web service; and the computer program is further operable to receive an off-hook event from the user interface web service.

23. A telephony device for providing telecommunication service comprising:

means for loading a text-based script, the script comprising a service definition identifying a web service and an address of the web service, the script further comprising an event handler identifying an event type and including a call to the web service;

means for receiving a text-based incoming event from the signaling web service indicating an incoming call;

means for determining that the incoming event corresponds to the event type of the event handler;

means for communicating a service request to the web service using the address;

means for sending a ring service request to the user interface web service in response to receiving the text-based incoming event from the signaling web service;

means for waiting a predetermined period of time after sending the ring service request;

means for sending a service request to a voicemail web service, after the predetermined period of time; and means for sending a stop ringing service request to the user interface web service after sending the service request to the voicemail web service.

* * * * *